United States Patent [19]

Williams

[11] Patent Number: 4,958,847
[45] Date of Patent: Sep. 25, 1990

[54] TOW BAR ASSEMBLY

[76] Inventor: Gregory J. Williams, 523½ E. Sixth St., Reno, Nev. 89512

[21] Appl. No.: 248,738

[22] Filed: Sep. 23, 1988

[51] Int. Cl.$^5$ ............................................. B60D 1/167
[52] U.S. Cl. ................................ 280/502; 280/491.1; 280/491.5; 280/507; 280/511
[58] Field of Search ............... 280/504, 502, 500, 501, 280/507, 511, 514, 480

[56] References Cited

U.S. PATENT DOCUMENTS

| | | | |
|---|---|---|---|
| 2,52,793 | 9/1950 | Koeckritz | 280/491.5 X |
| 2,521,132 | 9/1950 | Smith | 280/511 |
| 2,693,369 | 12/1952 | Gross | 280/502 |
| 3,113,789 | 12/1961 | Safford | 280/502 |
| 3,119,631 | 1/1964 | Wanamaker | 280/446 R |
| 3,178,204 | 4/1965 | Croft | 280/502 |
| 3,302,958 | 2/1967 | Fawcett et al. | 280/481 |
| 3,472,529 | 8/1967 | Gal | 280/502 |
| 3,481,630 | 12/1968 | Parkhurst | 280/502 |
| 3,481,631 | 12/1968 | Parkhurst | 280/502 |
| 3,492,022 | 1/1970 | Hansen | 280/491.5 X |
| 3,547,470 | 12/1970 | Parkhurst | 280/502 |
| 3,781,038 | 12/1973 | Bachel et al. | 280/491.4 X |
| 3,806,162 | 4/1974 | Milner | 280/502 |
| 4,022,489 | 5/1977 | Shattles et al. | 280/502 X |
| 4,196,919 | 4/1980 | Tomen | 280/502 |
| 4,266,800 | 5/1981 | Hawkins | 280/480 X |
| 4,374,593 | 2/1983 | Smith et al. | 280/491 E |

*Primary Examiner*—Mitchell J. Hill
*Attorney, Agent, or Firm*—Poms, Smith, Lande & Rose

[57] ABSTRACT

A tow bar assembly used to tow cars located on uneven terrain. The assembly uses two tow bars. One end of each tow bar is attached to a bumper housing. Each bumper housing is removably clamped to the bumper of a disabled vehicle by a chain which has one end secured to the undercarriage of the vehicle and the other end engaged to a chain hook member. The chain is pulled tight by tightening wing nuts threaded onto the upper end of a bolt which causes a spring located between the wing nuts and the top of the bumper housing to pull the chain tight. A socket member located where the other ends of the tow bars join together engages a ball member mounted on a supporting structure of a tow vehicle providing a universal-type joint. The socket member is secured to the ball member by a rotating latch member which uses a pin to prevent the latch member from rotating relative to the socket member, effectively locking the socket member to the ball member.

20 Claims, 5 Drawing Sheets

TOW BAR ASSEMBLY

BACKGROUND OF THE INVENTION

The present invention relates generally to tow bar assemblies and, more particularly, to a rugged tow bar assembly capable of operating with extreme differences in height between towed and towing vehicles.

A variety of different tow bar assemblies have been used in the past for the purpose of towing disabled vehicles. Such tow bar assemblies are shown, for example, in U.S. Pat. Nos. 4,374,593, issued to Smith, et al. on Feb. 22, 1983; 3,806,162, issued to Milner on Apr. 23, 1974; 3,472,529, issued to Gal on Oct. 14, 1969; and 3,119,631, issued to Wanamaker on Jan. 28, 1964. However, these tow bar assemblies are either too bulky, complicated and expensive using too many parts, or difficult to use when the vehicle to be towed is located on uneven terrain such as in a ditch, etc. Trailer hitch assemblies are disclosed in U.S. Pat. Nos. 4,196,919, issued to Tomen on Apr. 8, 1980; 3,481,630 and 3,481,631, issued to Parkhurst on Dec. 2, 1969; and 2,693,369, issued to Gross on Nov. 2, 1954. A bumper hitch assembly is described in U.S. Pat. No. 3,113,789, issued to Safford on Dec. 10, 1963. Finally, a bumper attachment used for parking a vehicle is disclosed in U.S. Pat. No. 3,302,958, issued to Fawcett, et al. on Feb. 7, 1967.

SUMMARY OF THE INVENTION

None of the above patents discloses a tow bar assembly that is relatively inexpensive to manufacture and easy to use when a vehicle to be towed is located on uneven terrain.

It is an object of this invention to provide an improved tow bar assembly.

It is another object of this invention to provide a tow bar assembly which is economical to manufacture, that can be used on a variety of different vehicles.

It is still another object of this invention to provide a tow bar assembly that may be used to tow a vehicle located on uneven terrain when the vehicle is located above or below a tow vehicle.

It is still another object of this invention to provide a tow bar assembly that uses a universal ball-socket connection at the support structure of a tow truck that may be easily connected and disconnected and which facilitates towing on uneven terrain.

It is still another object of this invention to provide a tow bar assembly which may be easily connected and disconnected to the bumper of a vehicle to be towed.

These and other objects and advantages are attained by a tow bar assembly used to tow cars located on uneven terrain. The assembly uses two pivotally coupled tow bars. One end of each tow bar is attached to a bumper housing. A first chain attached to a clip engaged to the bumper is used to position the bumper housing on the bumper of a disabled vehicle. After the housing is positioned, it is removably clamped to the bumper by a second chain which has one end secured to the undercarriage of the vehicle and the other end engaged to a chain hook member. The second chain is pulled tight by tightening wing nuts threaded onto the upper end of a bolt engaging the bumper housing which causes a spring located between the wing nuts and the top of the housing to pull the chain tight.

A socket member located where the other ends of the tow bars are pivotally joined together engages a ball member mounted on a supporting structure of a tow vehicle providing a universal-type joint allowing the socket member to rotate with respect to the ball member. The socket member is secured to the ball member by a rotating latch member which uses a pin to prevent the latch member from rotating relative to the socket member, effectively locking the socket member to the ball member.

The various features of the present invention will be best understood together with further objects and advantages by reference to the following description of the preferred embodiment taken in conjunction with the accompanying drawings.

DESCRIPTION OF THE PREFERRED EMBODIMENT

The following specification taken in conjunction with the drawings sets forth the preferred embodiment of the present invention in such a manner that any person skilled in the art can make and use the invention. The embodiment of the invention disclosed herein is the best mode contemplated by the inventor for carrying out his invention in a commercial environment although it should be understood that various modifications can be accomplished within the parameters of the present invention.

Figures 1, 2, 22:
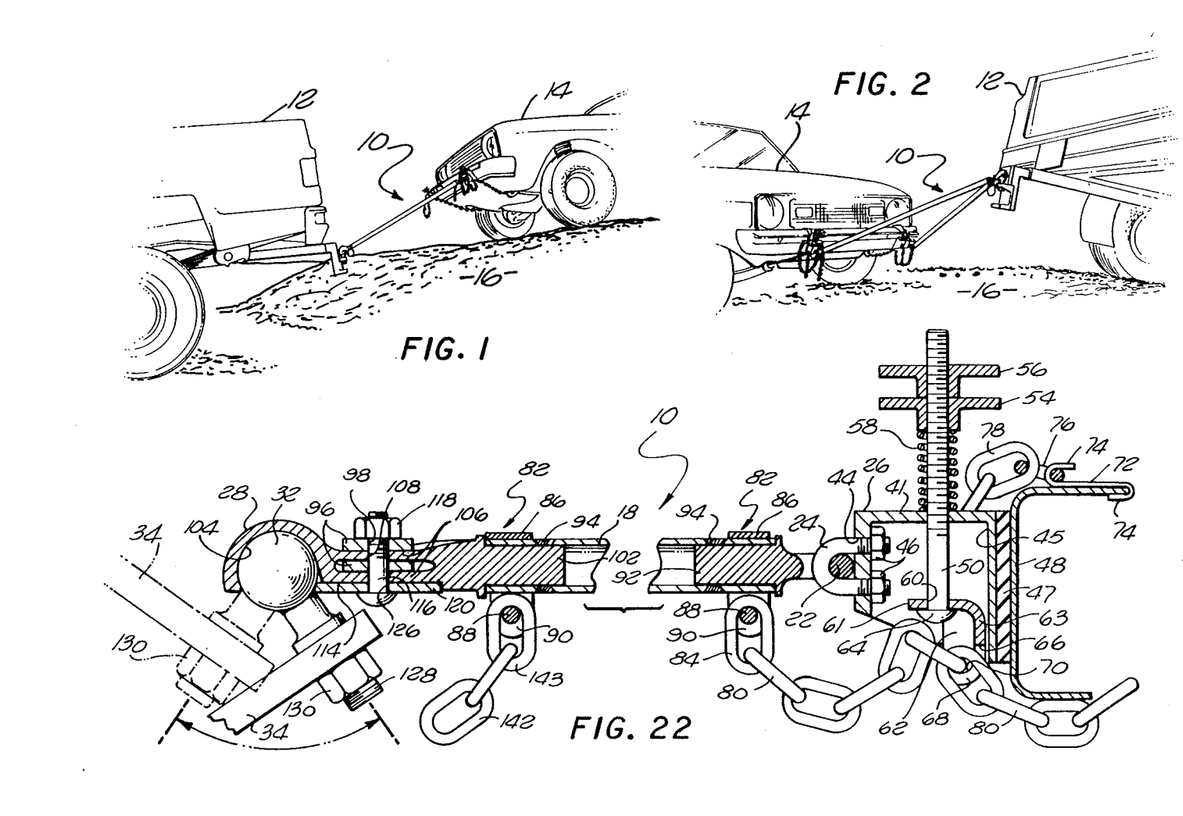
FIG. 1 is a perspective view of a tow bar assembly illustrating the principles of the present invention showing how the assembly may be used to tow a vehicle located on terrain above a tow vehicle.
FIG. 2 is a perspective view of the tow bar assembly of FIG. 1 showing how the assembly may be used to tow a vehicle located on terrain below a tow vehicle.
FIG. 22 is a partial cross-sectional view of the socket member, one of the tow bars and one of the bumper housings, illustrating how the housing is connected to a bumper and how the socket member rotatably engages the ball member providing a universal-type joint.

FIGS. 1 and 2 show the tow bar assembly 10 of the present invention being used by a tow vehicle or truck 12 to tow a disabled vehicle 14. Note that the tow bar assembly 10 may be used to tow a vehicle 14 located on uneven terrain 16 above or below the tow truck or other towing vehicle 12.

Figure 3:
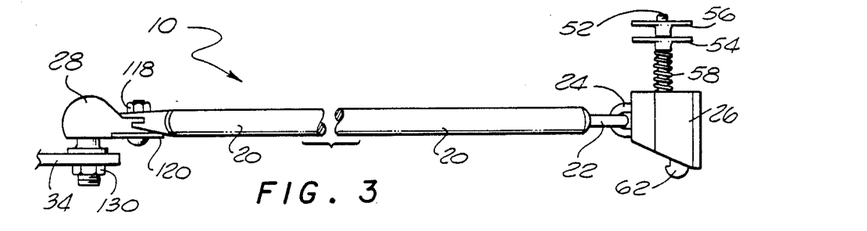
FIG. 3 is a side elevational view of the tow bar assembly of FIG. 1.
Figure 4:
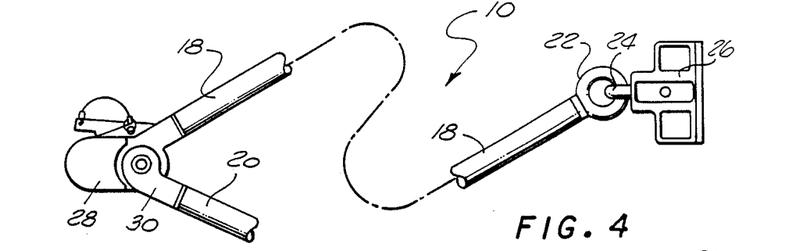
FIG. 4 is a top plan view of the tow bar assembly of FIG. 1 with portions of the two tow bars broken away showing an end of one of the two tow bars connected to a bumper housing by an eye bolt engaged to a U-bolt attached to the housing.

Referring now to FIGS. 3 and 4, the tow bar assembly 10 uses two tow bars 18 and 20 orientated in a general V-shaped configuration as shown in FIGS. 2 and 4. Each of the tow bars 18 and 20 has an eye fastener 22 attached to one end thereof. The eye fasteners 22 are used to engage the ends of the bars 18 and 20 to U-bolts 24 attached to two bumper housings 26 which are used to engage the tow bar assembly 10 to a disabled vehicle 14. The eye fasteners 22 are free to rotate with respect to the U-bolts 24. The other ends of the tow bars 18 and 20 are attached to a socket member 28 and clevis member 30, respectively, with the socket member 28 rotatably engaging a ball member 32 attached to a supporting structure 34 of the tow vehicle 12 in order to provide a universal-type joint, as explained in the following discussion.

Figure 5:
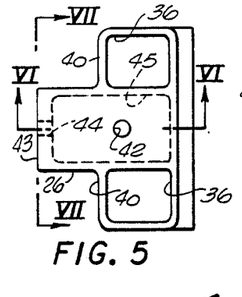
FIG. 5 is a top plan view of one of the bumper housings used for the assembly.
Figure 6:
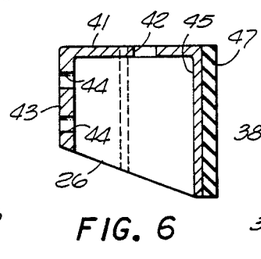
FIG. 6 is a cross-sectional view taken in the direction of arrows VI—VI shown in FIG. 5.
Figure 7:
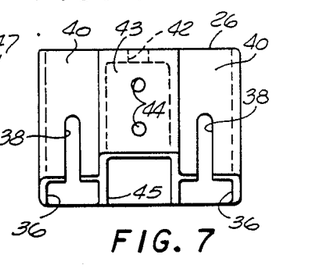
FIG. 7 is a front elevational view of the bumper housing taken in the direction of arrows VII—VII shown in FIG. 5.

FIGS. 5 through 7 show one of the bumper housings 26 used to removably engage the tow bar assembly 10 to the disabled vehicle 14. Each housing 26 has two cavities or apertures 36 passing therethrough from the top to the bottom thereof as shown in FIGS. 5 and 7. In addition, slotted grooves 38 exist in a corresponding wall 40 adjacent each cavity 36 of the housing 26 extending part of the way upward from the bottoms of the cavities 36 as shown in FIG. 7. The central portion of the housing 26 is hollow, having a central cavity 45. An aperture 42 passes through the top wall portion 41 of the housing 26 and two apertures 44 pass through the front wall portion 43 of the housing 26. A resilient pad 47, preferably made out of rubber or the like, is attached to the back of the housing bushing 26 using any convenient method such as adhesive or the like.

The U-bolts 24 engage apertures 44 in the bumper housings 26 and are secured to the housings 26 by nuts 46 as shown in FIG. 22. The eye fasteners 22 (see FIGS. 3, 4, 10 and 22) attached to the ends of the tow bars 18 and 20 engage the U-bolts 24 attaching the bars to the bumper housings 26.

Figure 18:
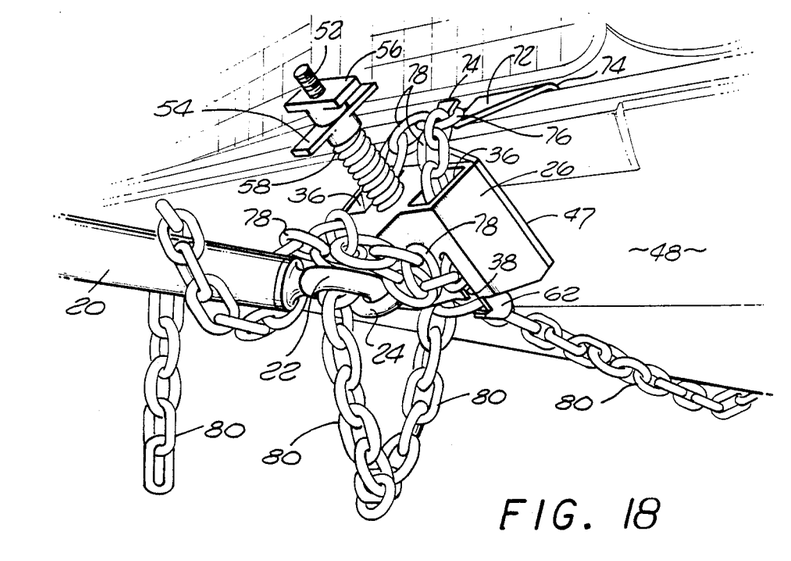
FIG. 18 is a perspective view showing how the bumper housing may be removably connected by chains to the bumper of a vehicle to be towed.

Referring now to FIGS. 18 and 22, the bumper housings 26 are used to removably engage the tow bar assembly 10 to the bumper 48 of a disabled vehicle 14. In order to accomplish this, each housing 26 has an elongated bolt 50 which slidably engages aperture 42 in the top wall 41 of the housing 26. A threaded portion 52 of the bolt 50 extends upward from wall 41. Two wing nuts 54 and 56 engage the threaded portion 52 as shown in FIG. 22 such that a spring 58 is trapped between the bottom of wing nut 54 and the top of wall 41. However, both 50 may be used without spring 58 if desired. The bottom end of bolt 50 passes into cavity 45 of housing 26 engaging an aperture 60 in a lug 61 of a chain hook member 62 (see FIGS. 11 through 13) and has a head 60 at the bottom end thereof which bears against the bottom of lug 61 causing member 62 to move upward with bolt 50.

Figure 11:
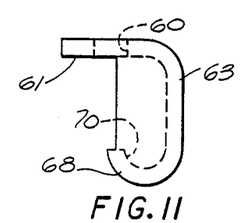
FIG. 11 is a side elevational view of one of the chain hook members used with the bumper housing.
Figure 12:
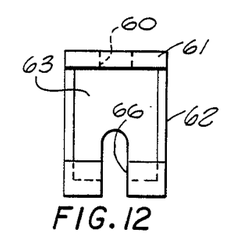
FIG. 12 is a front elevational view of the chain hook member of FIG. 11.
Figure 13:
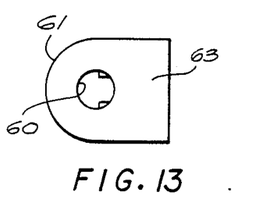
FIG. 13 is a top plan view of the chain hook member of FIG. 11.
Figure 14:
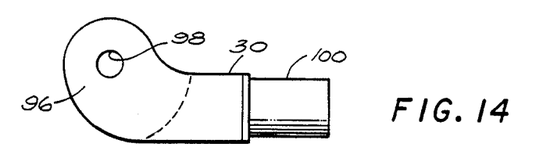
FIG. 14 is a top plan view of a clevis member attached to the end of one of the tow bars.
Figure 15:
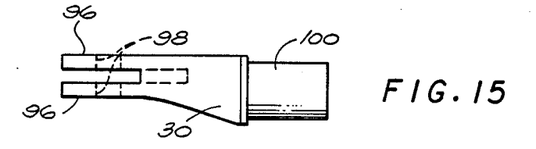
FIG. 15 is a side elevational view of the clevis member of FIG. 14.

FIGS. 11 through 13 show one of the chain hook members 62. The chain hook member 62 has a curved portion 68 at the bottom thereof with a concave surface 70 and a slotted groove 66 passing through portion 68 and extending part of the way up vertical portion 63 of member 62.

Figure 8:
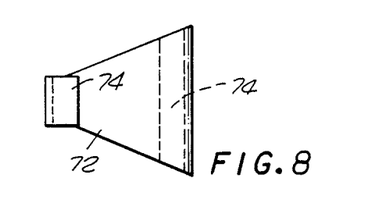
FIG. 8 is a top plan view of a bumper clip.
Figure 9:
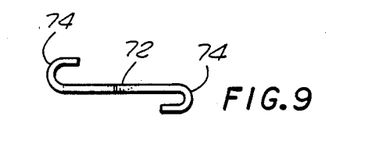
FIG. 9 is a side elevational view of the bumper clip of FIG. 8.
Figure 10:
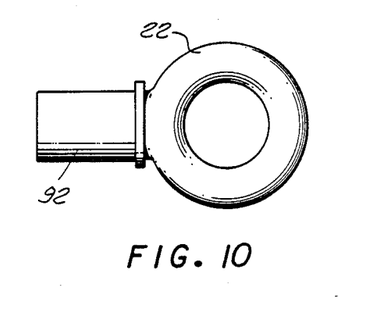
FIG. 10 is a detailed view of one of the eye fasteners used for the tow bars.

A bumper clip 72 shown in FIGS. 8 and 9 is also used with each bumper housing 26. The bumper clip 72 has curved engaging portions 74. Each bumper housing 26 is removably connected to the bumper 48 of a vehicle 14 by first engaging one of the portions 74 of one of the clips 72 to the bumper 48 as shown in FIGS. 18 and 22 and then engaging the other portion 74 of the slip 72 to a link 76 of a length of chain 78. As best shown in FIG. 18, the ends of the length of chain 78 are used with the tow rod assembly 10 so that they pass down cavities 36 in housing 26 and engage slotted grooves 38 of the housing 26 in such a way that bumper clip 72 and the engagement of chain 78 with grooves 38 offer sufficient support for the bumper housing 26 in order to allow the housing 26 to hang on the vehicle bumper 48 prior to clamping of the housing 26 to the bumper 48.

After each bumper housing 26 is positioned on the bumper 48 by clip 72 and length of chain 78, another length of chain 80 is used to clamp or secure the housing 26 to the bumper 48. This is accomplished by first securing one end of the length of chain 80 to the undercarriage or other lower supporting structure of the vehicle 14 to be towed (see FIGS. 1 and 2), and then engaging the chain 80 to curved portion 68 and concave surface 70 of the chain hook member 62 so that chain 80 also engages slotted groove 66 in member 62 as shown in FIGS. 18 and 22. Wing nut 54 is then tightened (screwed) compressing spring 58 which forces (biases) head 64 against the bottom of lug 61 causing chain hook member 62 to move upward inside cavity 45, thus causing chain 80 engaged to member 62 to tighten, resulting in bumper housing 26 being clamped or engaged to bumper 48. Note that pad 47 cushions the bumper housing 26 as it is clamped to the bumper 48. In addition, wing nut 56 may be tightened so that it functions as a lock nut helping to prevent nut 54 from coming loose.

Note that FIG. 18 shows the loose end of chain 80 draped over tow bar 20. Preferably, a clamp 82 is secured to bar 20 which would allow the end link 84 of chain 80 to be removably connected to the clamp 82 which adds backup support in case the chain 80 slips loose during towing operations. In such a case, the chain 80 would remain connected to clamp 82 or the tow bar 20 preventing the tow bar assembly 10 from disconnecting from the towed vehicle 14. Any type of fastening device may be used for clamp 82 which will allow chain 80 to be easily connected and disconnected from the clamp 82 such as a sleeve 86 that fits around bar 18 as shown in FIG. 22 having a bolt 88 that may be fastened and loosened to removably clamp two lugs 90 together in order to connect link 84 to bar 18. However, the tow bar assembly 10 may be used without such a clamp 82 if desired.

The tow bar assembly 10 may be disconnected from the bumper 48 by simply loosening wing nuts 54 and 56 of each bumper housing 26 allowing springs 58 to expand and chain hook members 62 to lower loosening the chains 80 so that the housings 26 are no longer clamped to the bumper 48. Chains 78 may then be slid out of slotted grooves 38 in the bumper housings 26 allowing the chains 78 to be loosened and the bumper clips 72 to be removed from the bumper 48.

If a person is unable to engage bumper clip 72 to the bumper 48, for example, because the bumper is a round pipe-like bumper, chain 78 may still be used with the bumper 48. This is accomplished by looping chain 78 around the back of the bumper 48 so that link 76 is engaged to chain hook member 62. Chain 80 is then engaged to member 62 and the undercarriage thereby holding housing 26 to the bumper 48. Housing 26 may also be attached to the undercarriage of the disabled vehicle 14 using chains 78 and 80. When housing 26 is attached to the undercarriage, chain 78 is looped around a supporting member under the vehicle 14 and link 76 is engaged to hook member 62 in the same way that the link 76 is engaged when chain 78 is lopped around the back of bumper 48. Chain 80 may then be engaged to hook member 62 and some part of the undercarriage thereby securing housing 26 to the undercarriage.

The housing 26 may also be attached to the bumper 48 or undercarriage of the vehicle 14 without using clip 72 by passing chain 80 through chain 78 (such or through link 76) and then looping chain 80 around the back of bumper 48 or around a supporting member under the vehicle 14 so that one end of chain 80 is secured to the undercarriage and the opposite end is engaged to hook member 62. Thus, housing 26 may be used with or without bumper clip 72 and may be secured to either the bumper 48 or the undercarriage of the disabled vehicle 14.

It is important to note that the ends of tow bars 18 and 20 have identical eye fasteners 22 that attach the bars to identical bumper housing 26. This is best shown in FIGS. 1 and 2. Also, the tow bars 18 and 20 are preferably made out of pipe and the eye fasteners 22 are preferably connected to the bars 18 and 20 by cylindrical members 92 which fit inside the bars 18 and 20 and are plug welded 94 to the bars (see FIGS. 10 and 22). However, any other suitable means of connecting cylindrical members 92 to tow bars 18 and 20 may be used. For example, cylindrical members 92 and bars 18 and 20 may have apertures passing there through that would allow nuts and bolts 94 (not shown) to be used to connect these parts together. If nuts and bolts are used, the tow bars 18 and 20 may be unbolted from the cylindrical members 92 and replaced by other bars.

Turning now to FIGS. 14 through 17 and 19, the other ends of the tow bars 18 and 20 are connected to socket member 28 and clevis member 30, respectively. The clevis member 30 has two forked members 96, apertures 98 passing through the members 96 and a cylindrical member 100 attached thereto. The clevis member 30 may be attached to the tow bar 20 by a plug weld or nuts and bolts similar to how cylindrical members 92 may be attached to bars 18 and 20. Socket member 28 also has a cylindrical member 102 which may be used to connect it to tow bar 18 in a similar manner. Nuts and bolts (not shown) may be used to attach the tow bars 18 and 20 to the cylindrical members 100 and 102 which allow the tow bars to be unbolted from the cylindrical members and replaced by other bars.

Figure 16:
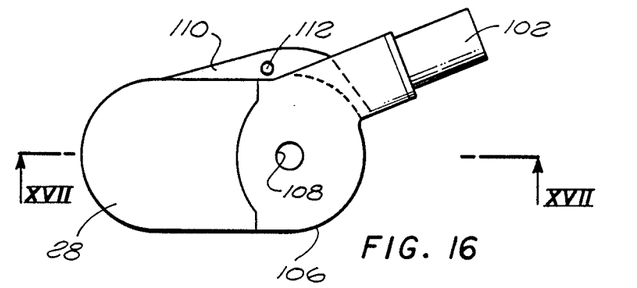
FIG. 16 is a top plan view of a socket member attached to the end of the other tow bar.
Figure 17:
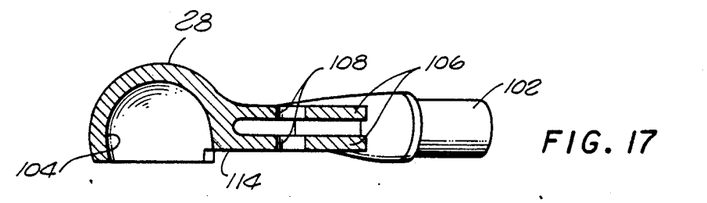
FIG. 17 is a cross-sectional view taken in the direction of arrows XVII—XVII shown in FIG. 16.

Socket member 28 connected to tow bar 18 has a socket cavity 104 near the end thereof, two forked members 106 with apertures 108 passing therethrough and an extension 110 with an aperture 112 passing therethrough. Extension 110 is preferably flat and in alignment with or in the same plane as the bottom 114 of lower forked member 106.

Figure 19:
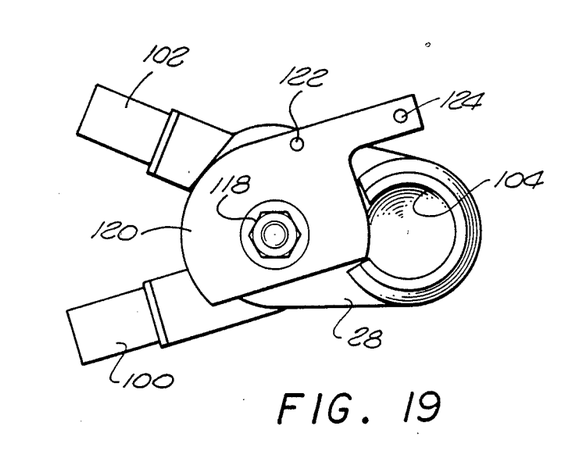
FIG. 19 is a bottom plan view of the clevis member of FIG. 15, socket member of FIG. 16 and a rotatable latch member with the members held together by a bolt and nut (see FIG. 22)
Figure 20:
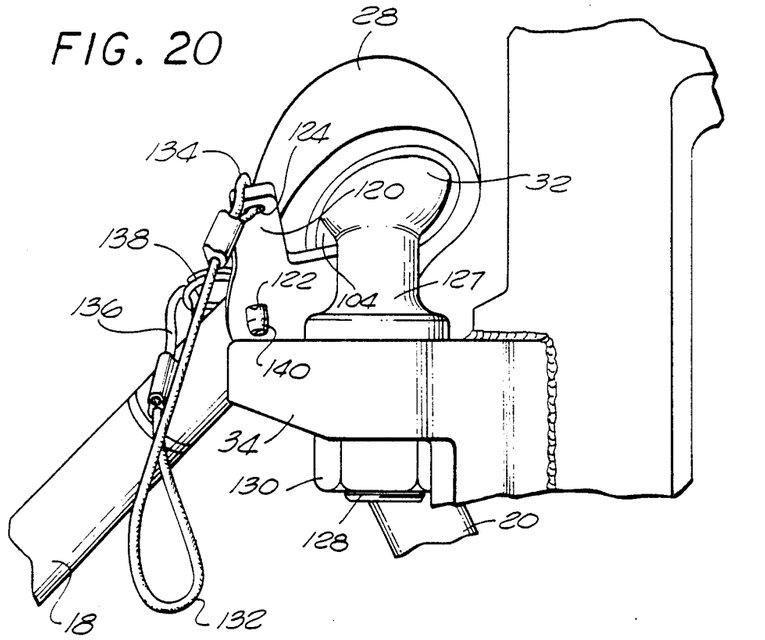
FIG. 20 is a perspective view showing how the rotatable latch member is used with a locking pin to removably engage the socket member to a ball member attached to the supporting structure of a tow vehicle.

Referring now to FIGS. 19 and 22, the ends of tow bars 18 and 20 are preferably held together by a bolt 116 and nut 118 when forked members 96 of clevis member 30 are engaged to the forked members 106 of socket member 28. Bolt 116 passes through apertures 98 and 108 in forked members 96 and 106, respectively. Note that the nut 118 may be located on the top of the joint (see FIG. 22) or at the bottom of the joint (see FIG. 21) as desired. Also held to the bottom 114 of forked member 106 by bolt 116 and nut 118 is a rotatable latch member 120 having apertures 122, 124 and 126 passing therethrough. Preferably, latch member 120 is a plate-like member as shown in FIGS. 19, 20 and 22. Bolt 116 passes through aperture 126 in latch member 120 and nut 118 is tightened in such a way to allow member 120 to be manually or frictionally rotated to allow aperture 122 in member 120 to be aligned with aperture 112 in socket member 28. As such, tow bars 18 and 20 are pivotally joined together by bolt 116. Since tow bars 18 and 20 are pivotally joined together, the bars may be conveniently rotated toward each other after removal from truck 12 and vehicle 12 and folded together to facilitate storage, transportation or handling of the tow bar assembly 10.

Figure 21:
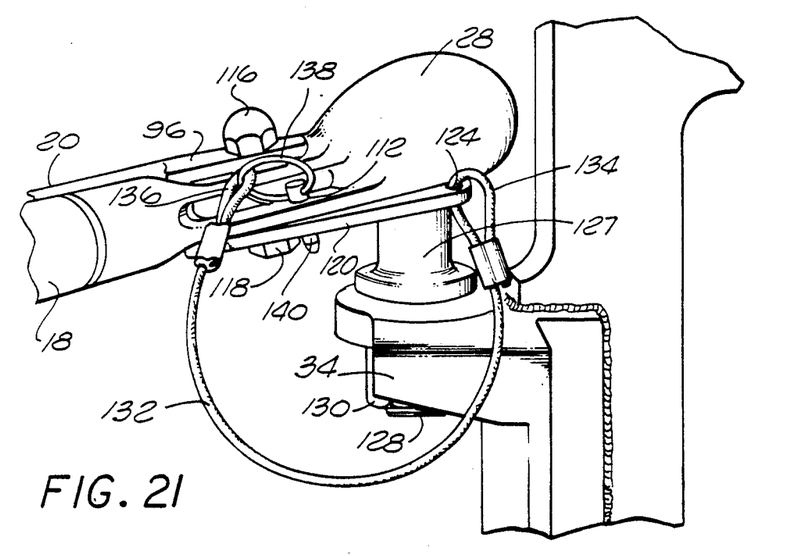
FIG. 21 is another perspective view of the socket member removably engaged to the ball member by the rotatable latch and locking pin.

FIGS. 20, 21 and 22 show how the socket member 28 engages ball member 32 mounted on supporting structure 34 of the tow truck 12. The supporting structure 34 may be of any desirable configuration. The ball member 32 is preferably mounted on a stem member 127 having a threaded end 128 passing through an aperture (not shown) in structure 34 which is secured to structure 34 by a nut 130 screwed onto end 128. Socket cavity 104 engages ball member 32 so that a universal-type point is provided as illustrated in FIG. 22 showing how ball member 32 is free to rotate inside cavity 104 or with respect to socket member 28, or vice versa.

Rotatable latch member 120 preferably has one end of a cable 132 attached to aperture 124 by loop 134. The other end of the cable 132 has a loop 136 attached to a ring 138 connected to a pin 140. The socket member 28 may be secured to the ball member 32 by rotating latch member 120 until aperture 122 therein is aligned with aperture 112 in extension 110 of socket member 28 and then inserting pin 140 through both apertures 112 and 122, preventing latch member 120 from rotating with respect to socket member 28. When in this position, latch member 120 closes off a portion of cavity 104 as best shown in FIG. 20 preventing ball member 32 from disengaging socket cavity 104. However, socket member 28 will still be able to rotate with respect to ball member 32 or act like a universal-type joint when in this locked state. Pin 140 may be of any desirable type and preferably is designed so that the pin 140 will not slip out of apertures 112 and 122 when a vehicle 14 is being towed. For example, a cotter pin may be used, or a pin with a spring-loaded ball at the end thereof, or the like.

A chain 142 may be used in conjunction with a clamp 82 connected to tow bar 18 in the same way that chain 80 is used with a similar clamp 82 as backup support in case socket member 28 slips free of ball member 32 during towing operations. Link 143 at one end of chain 142 would be connected to clamp 82 while the other end of the chain 142 would be connected to support structure 34 or some other part of the undercarriage of the truck 12.

The above description discloses the preferred embodiment of the present invention. However, persons of ordinary skill in the art are capable of numerous modifications once taught these principles such as, by way of example and not limitation, the tow bars 18 and 20 may be made out of solid members rather than steel tubing, the U-bolts 24 may be welded rather than secured by nuts 46 to the bumper housings 26, springs 58 may be located inside cavities 45 rather than on top of the bumper housings 26, and a spring-loaded joint rather than a bolt 116 and nut 118 may be used to connect the socket member 28 to clevis member 30 and rotatable latch 120. In addition, tow bars 18 and 20 may be unbolted from the cylindrical members 100 and 102 connected to the clevis member 30 and socket member 28, respectively, and from cylindrical members 92 connected to the eye fasteners 22 and replaced by other tow bars. For example, tow bars 18 and 20 that are bent rather than straight may be used for the tow bar assembly 10. The bars 18 and 20 may be bent or slanted downward toward the ends which engage the housing 26 starting near the middle of the bars and continuing for a certain distance until the slanted bars become straight or horizontal again, the horizontal portions of the bars extending to where th eye fasteners 22 attach to the bars. As such, horizontal lengths of the bars 18 and 20 at both ends of the bars are at different levels connected together by downward slanted lengths or portions of the bars so that the horizontal lengths near the socket member 28 are at a higher level or elevation than the horizontal lengths connected to the eye fasteners 22. When the tow bars 18 and 20 are bent like this, the horizontal lengths of the bars connected to the eye fasteners 22 may be conveniently positioned under a disabled vehicle 14 when housings 26 are attached to the undercarriage of the vehicle. Note that the pivotable engagement of the eye fasteners 22 to the U-bolts 24 facilitate attaching housings 26 to the undercarriage of the vehicle 14. Also, downward bent tow bars 18 and 20 make it easier to tow a disabled vehicle 14 located below the tow truck 12. Such downward bent tow bars 18 and 20 may also be used when the housings 26 are attached to the bumper 48 of a vehicle 14. Accordingly, it will be understood by those skilled in the art that changes in form and details may be made to the above-described embodiment without departing from the spirit and scope of the invention.

I claim:

1. A tow bar assembly for use with a tow vehicle having an undercarriage supporting structure used to tow a disabled vehicle comprising:

two elongated tow bars, each of said bars having first and second ends;

housing means pivotally engaged to each of said first ends of said tow bars for removably clamping said tow bar assembly to said disabled vehicle;

a ball member mounted on said supporting structure of said tow truck;

socket means engaged to said second ends of said tow bars for removably and rotatably engaging said tow bar assembly to said ball member on said supporting structure of said tow vehicle; and rotating latch means rotatably and directly engaged to said socket means for removably securing said socket means to said ball member on said supporting structure, said rotating latch means including a single integral member rotatably and directly engaged to said socket means and adapted to rotate so that said integral member will come into contact with said ball member in order to removably secure said socket means to said ball member.

2. The tow bar assembly of claim 1 wherein each of said tow bars has an eye fastener connected to said first end, said eye fastener pivotally engaged to a U-bolt attached to said housing.

3. A tow bar assembly for use with a tow vehicle having an undercarriage supporting structure used to tow a disabled vehicle comprising:

two elongated tow bars, each of said bars having first and second ends;

housing means pivotally engaged to each of said first ends of said tow bars for removably clamping said tow bar assembly to said disabled vehicle;

a ball member mounted on said supporting structure of said tow truck;

socket means engaged to said second ends of said tow bars for removably and rotatably engaging said tow bar assembly to said ball member of said supporting structure of said tow vehicle; and rotating latch means rotatably engaged to said socket means for removably securing said socket means to said ball member on said supporting structure, said rotating latch means adapted for contacting said ball member in order to removably secure said socket means to said ball member, each of said housing means comprising:

a. a housing having at least one cavity, at least one slotted groove, and an aperture in a top wall thereof, each of said at least one slotted groove, adjacent one of said at least one cavity, b. a bolt slidably engaging said aperture in said top wall, c. a chain hook member engaged to said bolt, d. wing nuts threaded onto said bolt, e. a first chain secured to said disabled vehicle and removably engaged to said hook member, and f. spring means located between said wing nuts and said housing for tightening said first chain in response to said wing nuts being tightened.

4. The tow bar assembly of claim 3 wherein said housing means further comprises a second chain and a clip having a portion thereof capable of being removably engaged to a bumper of said disabled vehicle, said second chain removably engaged to another portion of said clip, said second chain having at least one end thereof passing through one of said at least one cavity in said housing and removably engaging one of said at least one slotted groove in said housing.

5. A tow bar assembly for use with a tow vehicle having an undercarriage supporting structure used to tow a disabled vehicle comprising:

two elongated tow bars, each of said bars having first and second ends;

housing means pivotally engaged to each of said first ends of said tow bars for removable clamping said tow bar assembly to said disabled vehicle, each of said tow bars having an eye fastener connected to said first end and each of said housing means having a U-bolt attached thereto, each of said eye fasteners pivotally engaged to a corresponding one of said U-bolts;

a ball member mounted on said supporting structure of said tow truck;

socket means engaged to said second ends of said tow bars for removably and rotatably engaging said tow bar assembly to said ball member on said supporting structure of said tow vehicle, said socket means comprising:
- a. a socket member attached to one of said second ends of said tow bars, said socket member having forked members, said socket member rotatably engaging said ball member,
- (b b. a clevis member attached to the other of said second ends of said tow bars, said clevis member pivotally engaging said forked members of said socket member,
- c. fastening means for pivotally engaging said socket member to said clevis member; and rotating latch means rotatably and directly engaged to said socket means for removably securing said socket means to said ball member, said rotating latch means adapted for rotating movement resulting in contact with said ball member in order to removably secure said socket means to said ball member.

6. The tow bar assembly of claim 5 wherein said fastening means is a nut and bolt, said socket member and said clevis member having apertures therein, said bolt passing through said apertures in said socket member and said clevis member.

7. The tow bar assembly of claim 5 wherein said first ends of said tow bars are removably connected to said eye fasteners and said second ends of said tow bars are removably connected to said socket member and said clevis member so that said tow bars may be removed from said tow bar assembly and replaced by other tow bars.

8. A tow bar assembly for use with a tow vehicle having an undercarriage supporting structure used to tow a disabled vehicle comprising:

two elongated tow bars, each of said bars having first and second ends;

housing means pivotally engaged to each of said first ends of said tow bars for removably clamping said tow bar assembly to said disabled vehicle, each of said tow bars having an eye fastener connected to said first end and each of said housing means having a U-bolt attached thereto, each of said eye fasteners pivotally engaged to a corresponding one of said U-bolts;

a ball member mounted on said supporting structure of said tow truck;

socket means engaged to said second ends of said tow bars for removably and rotatably engaging said tow bar assembly to said ball member on said supporting structure of said tow vehicle, said socket means comprising:
- a. a socket member attached to one of said second ends of said tow bars, said socket member having forked members, said socket member rotatably engaging said ball member.
- b. a clevis member attached to the other of said second ends of said tow bars, said clevis member pivotally engaging said forked members of said socket member,
- (c. fastening means for pivotally engaging said socket member to said clevis member; and rotating latch means rotatably engaged to said socket means for removably securing said socket means to said ball member said fastening means being a nut and bolt, said socket member and said clevis member having apertures therein, said bolt passing through said apertures in said socket member and said clevis member, said socket member having a first pin aperture therein, said rotating latch means including a plate-like member rotatably engaged to said socket member and a pin, said plate-like member having a second pin aperture therein, said pin adapted to engage said first and second pin apertures when aligned in order to prevent movement of said plate-like member with respect to said socket member and to removably secure said socket member to said ball member.

9. A tow bar assembly for use with a tow vehicle having an undercarriage supporting structure used to tow a disabled vehicle comprising:

two elongated tow bars, each of said bars having first and second ends;

housing means pivotally engaged to each of said first ends of said tow bars for removably clamping said tow bar assembly to said disabled vehicle;

a ball member mounted on said supporting structure of said tow truck;

socket means engaged to said second ends of said tow bars for removably and rotatably engaging said tow bar assembly to said ball member of said supporting structure of said tow vehicle; and rotating latch means rotatably engaged to said socket means for removably securing said socket means to said ball member on said supporting structure, said rotating latch means adapted for contacting said ball member in order to removably secure said socket means to said ball member, said rotating latch means including a plate-like member having apertures therein rotatably engaged to said socket means and a pin, said socket means having an aperture therein, said pin adapted to engage said apertures in said plate-like member and said socket means in order to prevent relative movement therebetween and to removably secure said ball and socket means to said supporting structure.

10. A tow bar assembly for use with a tow vehicle having an undercarriage supporting structure used to tow a disabled vehicle, comprising:

two elongated tow bars, each of said bars having first and second ends;

housing means pivotally engaged to each of said first ends of said tow bars for removably attaching said tow bar assembly to a supporting part of said disabled vehicle;

a ball member mounted on said supporting structure of said tow vehicle;

socket member means attached to one of said second ends of said two bars for removably and rotatably engaging said ball member;

a clevis member attached to the other of said second ends of said tow bars, said clevis member pivotally engaged to said socket member means; and rotating latch means rotatably and directly engaged to said socket member means for removably securing said socket member means to said ball member, said rotating latch means adapted for rotating movement resulting in contact with said ball member in order to removably secure said socket member means to said ball member.

11. The tow bar assembly of claim 10 further comprising fastening means for pivotally engaging said socket member means, said clevis member and said rotating latch means together so that said tow bars are capable of being rotated toward each other to a folded position in order to facilitate storage and handling of said tow bar assembly.

12. The tow bar assembly of claim 11 wherein said fastening means is a nut and a bolt, said socket member means, said clevis member and said rotating latch means having apertures therein, said bolt passing through said apertures in said socket member means, said clevis member and said rotating latch means.

13. A tow bar assembly for use with a tow vehicle having an undercarriage supporting structure used to tow a disabled vehicle, comprising:
two elongated tow bars, each of said bars having first and second ends;
housing means pivotally engaged to each of said first ends of said tow bars for removably attaching said tow bar assembly to a supporting part of said disabled vehicle;
a ball member mounted on said supporting structure of said tow vehicle;
socket member means attached to one of said second ends of said tow bars for removably and rotatable engaging said ball member;
a clevis member attached to the other of said second ends of said tow bars, said clevis member pivotally engaged to said socket member means;
rotating latch means rotatably engaged to said socket member means for removably securing said socket member means to said ball member; and
fastening means for pivotally engaging said socket member means, said clevis member and said rotating latch means together so that said tow bars are capable of being rotated toward each other to a folded position in order to facilitate storage and handling of said tow bar assembly, said fastening means including a nut and a bolt, said socket member means, said clevis member and said rotating latch means having apertures therein, said bolt passing through said apertures in said socket member means, said clevis member and said rotating latch means, said socket member means including a first pin aperture therein, said rotating latch means including a plate-like member rotatably engaged to said socket member means and a pin, said plate-like member having a second pin aperture therein, said pin adapted to engage said first and second pin apertures when aligned in order to prevent movement of said plate-like member with respect to said socket member means and to removably secure said socket member means to said ball member.

14. The tow bar assembly of claim 13 wherein said socket member means includes forked members, said clevis member having forked members pivotally engaging said forked members of said socket member means.

15. The tow bar assembly of claim 14 wherein each of said housing means comprises:
a housing having two cavities, two slotted grooves and an aperture in a top wall thereof, each of said slotted grooves adjacent one of said cavities;
a bolt slidably engaging said aperture in said top wall;
a chin hook member engaged to said bolt;
wing nuts threaded onto said bolt;
a first chain secured to said disabled vehicle and removably engaged to said hook member; and
spring means located between said wing nuts and said housing for tightening said first chain in response to said wing nuts being tightened.

16. The tow bar assembly of claim 15 each of said housing means further comprises a second chain and a clip having a portion thereof removably engaged to said supporting part of said disabled vehicle, said second chain removably engaged to another portion of said clip, said second chain having ends thereof passing through said cavities in said housing and removably engaging said slotted grooves in said housing.

17. The tow bar assembly of claim 16 further comprising a resilient pad attached to a back side of said housing and clamps attached to said tow bars, each of said first chains capable of removably engaging one of said clamps.

18. A tow bar assembly for use with a tow vehicle having an undercarriage supporting structure used to tow a disabled vehicle, comprising:
two elongated tow bars, each of said bars having first and second ends;
housing means pivotally engaged to each of said first ends of said tow bars for removably attaching said tow bar assembly to a supporting part of said disabled vehicle, each of said bumper housing means including:
(a) a housing having two cavities, two slotted grooves and an aperture in a top wall thereof, each of said slotted grooves adjacent one of said cavities;
(b) a bolt slidably engaging said aperture in said top wall;
(c) a chain hook member engaged to said bolt;
(d) wing nuts threaded onto said bolt;
(e) a first chain secured to said disabled vehicle and removably engaged to said hook member; and
(f) spring means located between said wing nuts and said housing for tightening said first chain in response to said wing nuts being tightened;
a ball member mounted on said supporting structure said tow vehicle;
a socket member attached to one of said second ends of said tow bars, said socket member having a cavity therein and forked members, said ball member rotatably engaging, said cavity in said socket member;
a clevis member attached to the other of said second ends of said tow bars, said clevis member having forked members pivotally engaged to said forked members of said socket member;
a resilient pad attached to a back of said housing;
rotating latch means rotatably engaged to said socket member for removably securing said socket member to said ball member.

19. The tow bar assembly of claim 18 wherein said socket member includes a first pin aperture therein, said rotating latch means includes a plate-like member rotatably engaged to said socket member and a pin, said plate-like member having a second pin aperture therein, said pin capable of engaging said first and second pin apertures when aligned in order to prevent movement of said plate-like member with respect to said socket member and to removably secure said socket member to said ball member.

20. The tow bar assembly of claim 19 wherein each of said housing means further includes a second chain, said second chain having ends thereof passing through said cavities in said housing and removably engaging said slotted grooves in said housing, said first and second chains capable of being wrapped around said supporting part of said disabled vehicle while being removably engaged to said chain hook member in order to removably attach said housing means to said supporting part.

* * * * *